(12) United States Patent
Lacroix et al.

(10) Patent No.: US 10,152,124 B2
(45) Date of Patent: Dec. 11, 2018

(54) SYSTEMS AND METHODS FOR ENHANCED HAPTIC EFFECTS

(75) Inventors: Robert Lacroix, St. Lambert (CA); Danny Grant, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 1416 days.

(21) Appl. No.: 11/697,374

(22) Filed: Apr. 6, 2007

(65) Prior Publication Data

US 2007/0236449 A1    Oct. 11, 2007

Related U.S. Application Data

(60) Provisional application No. 60/790,408, filed on Apr. 6, 2006.

(51) Int. Cl.
*G06F 3/01*        (2006.01)
*H04M 1/725*     (2006.01)

(52) U.S. Cl.
CPC ........ *G06F 3/016* (2013.01); *H04M 1/72522* (2013.01); *A63F 2300/1037* (2013.01); *A63F 2300/204* (2013.01)

(58) Field of Classification Search
CPC ................ G06F 3/016; H04M 1/72522; A63F 2300/1037; A63F 2300/204
USPC .......................... 345/156–184; 715/701, 702
See application file for complete search history.

(56) References Cited

U.S. PATENT DOCUMENTS

| 3,618,070 A | 11/1971 | Kagan |
| 3,911,416 A | 10/1975 | Feder |
| 4,028,502 A | 6/1977 | Moricca et al. |
| 4,227,319 A | 10/1980 | Guy et al. |
| 4,262,549 A | 4/1981 | Schwellenbach |
| 4,278,920 A | 7/1981 | Ruoff, Jr. |
| 4,333,070 A | 6/1982 | Barnes |
| 4,352,091 A | 9/1982 | Yamasaki |
| 4,421,953 A | 12/1983 | Zielinski |

(Continued)

FOREIGN PATENT DOCUMENTS

| CN | 1450451 A | 10/2003 |
| EP | 1 351 118 | 10/2003 |

(Continued)

OTHER PUBLICATIONS

Patent Cooperation Treaty, International Search Report, International Application No. PCT/US2007/008659, dated Jul. 17, 2008.

(Continued)

*Primary Examiner* — Srilakshmi K. Kumar
*Assistant Examiner* — Brent D Castiaux
(74) *Attorney, Agent, or Firm* — Kilpatrick Townsend & Stockton

(57) ABSTRACT

Systems and methods for enhanced haptic effects are described. One described method includes receiving an input signal having haptic information and multimedia data, the input signal formatted in a first format, decoding the haptic information from the input signal, and determining a parameter associated with an actuator in a haptic device. The method further includes generating an actuator signal based at least in part on the parameter and the haptic information, and generating an output signal comprising the multimedia data and the actuator signal, the output signal formatted in a second format.

23 Claims, 4 Drawing Sheets

(56) References Cited

U.S. PATENT DOCUMENTS

| | | |
|---|---|---|
| 4,436,188 A | 3/1984 | Jones |
| 4,464,117 A | 8/1984 | Foerst |
| 4,484,191 A | 11/1984 | Vavra |
| 4,581,972 A | 4/1986 | Hoshino |
| 4,603,284 A | 7/1986 | Perzley |
| 4,794,392 A | 12/1988 | Selinko |
| 4,823,634 A | 4/1989 | Culver |
| 4,853,674 A | 8/1989 | Kiss |
| 4,918,438 A | 4/1990 | Yamasaki |
| 4,931,765 A | 6/1990 | Rollins et al. |
| 4,964,004 A | 10/1990 | Barker |
| 5,003,984 A | 4/1991 | Muraki et al. |
| 5,117,449 A | 5/1992 | Metroka et al. |
| 5,165,897 A | 11/1992 | Johnson |
| 5,175,459 A | 12/1992 | Daniel et al. |
| 5,189,389 A | 2/1993 | DeLuca et al. |
| 5,283,970 A | 2/1994 | Aigner |
| 5,366,376 A | 11/1994 | Copperman et al. |
| 5,368,484 A | 11/1994 | Copperman et al. |
| 5,414,337 A | 5/1995 | Schuler |
| 5,436,622 A * | 7/1995 | Gutman ............... G08B 6/00 340/407.1 |
| 5,437,607 A | 8/1995 | Taylor |
| 5,459,382 A | 10/1995 | Jacobus et al. |
| 5,482,051 A | 1/1996 | Reddy et al. |
| 5,489,812 A | 2/1996 | Furuhata et al. |
| 5,506,605 A | 4/1996 | Paley |
| 5,508,688 A | 4/1996 | Mochizuki |
| 5,524,061 A | 6/1996 | Mooney et al. |
| 5,575,761 A | 11/1996 | Hajianpour |
| 5,619,181 A | 4/1997 | Murray |
| 5,625,576 A | 4/1997 | Massie et al. |
| 5,642,413 A | 6/1997 | Little |
| 5,646,589 A | 7/1997 | Murray et al. |
| 5,666,473 A | 9/1997 | Wallace |
| 5,692,956 A | 12/1997 | Rifkin |
| 5,696,497 A | 12/1997 | Mottier et al. |
| 5,729,589 A | 3/1998 | Samson |
| 5,754,096 A | 5/1998 | Muto et al. |
| 5,757,280 A | 5/1998 | Motohashi |
| 5,764,751 A | 6/1998 | Konishi |
| 5,767,787 A | 6/1998 | Kudoh et al. |
| 5,816,823 A | 10/1998 | Naimark et al. |
| 5,844,392 A | 12/1998 | Peurach et al. |
| 5,844,498 A | 12/1998 | Ide |
| 5,867,796 A | 2/1999 | Inutsuka |
| 5,873,024 A | 2/1999 | Suzuki |
| 5,887,995 A | 3/1999 | Holehan |
| 5,889,670 A | 3/1999 | Schuler et al. |
| 5,917,906 A | 6/1999 | Thorton |
| 5,955,964 A | 9/1999 | Tada |
| 5,956,484 A | 9/1999 | Rosenberg et al. |
| 5,966,655 A | 10/1999 | Hardouin |
| 5,973,689 A | 10/1999 | Gallery |
| 5,988,902 A | 11/1999 | Holehan |
| 6,014,572 A | 1/2000 | Takahashi |
| 6,046,726 A | 4/2000 | Keyson |
| 6,061,451 A * | 5/2000 | Muratani et al. ............ 380/201 |
| 6,091,321 A | 7/2000 | Karell |
| 6,113,459 A | 9/2000 | Nammoto |
| 6,118,979 A | 9/2000 | Powell |
| 6,131,097 A | 10/2000 | Peurach et al. |
| 6,175,721 B1 | 1/2001 | Hayato |
| 6,218,958 B1 | 4/2001 | Eichstaedt et al. |
| 6,218,966 B1 | 4/2001 | Goodwin et al. |
| 6,272,319 B1 | 8/2001 | Narusawa |
| 6,300,938 B1 | 10/2001 | Culver |
| 6,307,465 B1 | 10/2001 | Kayama et al. |
| 6,373,463 B1 | 4/2002 | Beeks |
| 6,374,255 B1 | 4/2002 | Peurach et al. |
| 6,418,323 B1 | 7/2002 | Bright et al. |
| 6,424,251 B1 | 7/2002 | Byrne |
| 6,433,771 B1 | 8/2002 | Yocum et al. |
| 6,448,977 B1 | 9/2002 | Braun et al. |
| 6,563,487 B2 | 5/2003 | Martin et al. |
| 6,574,489 B1 | 6/2003 | Uriya |
| 6,650,338 B1 | 11/2003 | Kolarov et al. |
| 6,686,901 B2 | 2/2004 | Rosenberg |
| 6,819,312 B2 | 11/2004 | Fish |
| 6,822,635 B2 * | 11/2004 | Shahoian et al. ............ 345/156 |
| 6,864,877 B2 | 3/2005 | Braun et al. |
| 7,623,114 B2 * | 11/2009 | Rank ...................... 345/156 |
| 2002/0145512 A1 | 10/2002 | Sleichter, III et al. |
| 2002/0149561 A1 | 10/2002 | Fukumoto et al. |
| 2003/0030619 A1 | 2/2003 | Martin et al. |
| 2003/0057934 A1 * | 3/2003 | Tierling ............... H03C 1/36 324/76.12 |
| 2003/0090460 A1 | 5/2003 | Schena et al. |
| 2003/0122658 A1 | 7/2003 | Takahashi |
| 2003/0169151 A1 | 9/2003 | Ebling et al. |
| 2003/0188594 A1 | 10/2003 | Levin et al. |
| 2003/0222766 A1 | 12/2003 | Rollins et al. |
| 2004/0014484 A1 | 1/2004 | Kawashima |
| 2004/0056840 A1 | 3/2004 | Goldenberg et al. |
| 2004/0125120 A1 * | 7/2004 | Weiner ................ G06F 3/011 715/701 |
| 2005/0093847 A1 | 5/2005 | Altkorn et al. |
| 2005/0109145 A1 | 5/2005 | Levin et al. |
| 2005/0162383 A1 | 7/2005 | Rosenburg |
| 2005/0179565 A1 * | 8/2005 | Mase ................... G06F 3/016 341/21 |
| 2005/0235032 A1 | 10/2005 | Mason et al. |
| 2006/0061558 A1 | 3/2006 | Grant et al. |

FOREIGN PATENT DOCUMENTS

| | | |
|---|---|---|
| WO | WO 95/20787 | 8/1995 |
| WO | 1996/30222 | 10/1996 |
| WO | WO 97/18546 | 5/1997 |
| WO | WO 97/19398 | 5/1997 |
| WO | WO 01/91100 | 11/2001 |

OTHER PUBLICATIONS

Patent Cooperation Treaty, International Search Report, International Application No. PCT/US2007/008659, dated Oct. 16, 2008.

Curry, K., Supporting Collaborative Interaction in Tele-immersion, Thesis submitted to the Faculty of the Virginia Polytechnic Institute and the State University in partial fulfillment of the requirements for the degree of Master of Science in Computer Science and Applications, 1998.

Dennerlein, J. et al., Vibrotactile Feedback for Industrial Telemanipulators, Presented at the Sixth Annual Symposium on Haptic Interfaces for Virtual Environment and Teleoperator Systems, ASME IMECE, Dallas, Texas, Nov. 15-21, 199.

Eberhardt, S. et al., Force Reflection for Wimps: A Button Acquisition Experiment, Proceedings of the ASME Dynamic Systems and Control Division, presented at eh 1997 ASME Internaational Mechanical Engineering Congress and Exposition, Nov. 16-21, 1997, Dallas, Texas.

IEEE International Conference on Robotics and Automation, May 16-20, 1998, Lueven, Belgium.

Hayward, V. et al., Parameter Sensitivity Analysis for Design and Control of Force Transmission Systems, McGill University Center for Intelligent machines, 3480 Universtiy Street, Montreal, Quebec.

Kim, W., Telemanipulator Technology and Space Telerobotics, Proceedings from SPIE—The International Society for Optical Engineering, Sep. 7-9, 1993, Boston, Mass.

Kontarinis, D. et al., Tactile Display of Vibratory Information in Teleoperation and Virtual Environments, Presence, vol. 4, No. 4, Fall 1995, pp. 387-402.

Kontarinis, D. et al., Display of High-Frequency Tactile Information to Teleoperators, Harvard University Division of Applied Sciences, Cambridge, Mass.

MacLean, K., Designing with Haptic Feedback, Symposium on Haptic Feedback in the Proceedings of the IEEE Conference on Robotics and Automation, Apr. 22-28, 2000.

Marcus, B., Touch Feedback in Surgery, Official Proceedings of Virtual Reality and Medicine the Cutting Edge, Sep. 8-11, 1994, The New York Hilton.

(56) References Cited

OTHER PUBLICATIONS

McAffee, D. et al., Teleoperator Subsystem/ Telerobot Demonstrator: Force Reflecting Hand Controller Equipment Manual, Jet Propulsion Laboratory, Jan. 1988.
McLaughlin, M. et al., The USC Interactive Art Museum: Removing the Barriers between Museums and their Constituencies, web site at http://ascusc.org/icmc/paperforica.html, as available via the Internet and printed Jul. 22, 2003.
Mine, M. et al., Virtual Environment Interaction Techniques, Department of Computer Science, University of North Carolina, Chapel Hill, NC, 1995.
Minsky, M., Computational Haptics: The Sandpaper System for Synthesizing Texture for a Force-Feedback Display, Submitted to the Program in Media Arts and Sciences, School of Architecture and Planning, in partial fulfillment of the requirements for the degree of Doctor of Philosophy at the Massachusetts Institute of Technology, Jun. 1995.
Noll, M., Man-Machine Tactile, SID Journal, Jul./Aug. 1972.
Ouh-Young, M. et al., Creating an Illusion of Feel: Control Issues in Force Display, Computer Science Department, University of North Carolina at Chapel Hill, Sep. 16, 1989.
Ouh-Young, M., Force Display in Molecular Docking, The University of North Carolina at Chapel Hill, 1990.
Ouh-Young, M. et al., The Development of a Low-Cost Force Feedback Joystick and its Use in the Virtual Environment. Proceedings of the Third pacific Conference on Computer Graphics and Applications, Pacific Graphics , Aug. 21-24, 1995.
Pao, L. et al., Synergistic Visual/Haptic Computer Interfaces, Hanoi, Vietnam, pp. 155-162, May 1998.
Patrick, N. et al., Design and Testing of a Non-Reactive, Fingertip, Tactile Display fro Interaction with Remote Environments, Massachusetts Institute of Technology, Department of Mechanical Engineering.
Patrick, N., Design, Construction, and Testing of a Fingertip Tactile Display for Interaction with Virtual and Remote Environments, Submitted to the Department of Mechanical Engineering in partial fulfillment of the requirement for the degree of Masters of Science in Mechanical Engineering at the Mass. University of Technology, Aug. 1990.
Pimentel, K. et al., Virtual Reality through the New Looking Glass, Second Edition, 1995.
Rabinowitz, W. et al., Multidimensional Tactile Displays: Identification of Vibratory Intensity, Frequency, and Contractor Area, Journal of the Acoustical Society of America, vol. 82, No. 4, Oct. 1987.
Ramstein, C., Combining Haptic and Braille Technologies: Design Issues and Pilot Study, Second Annual ACM Conference on Assistive Technology, Apr. 11-12, 1996.
Rosenburg, L., Virtual Fixtures: Perceptual Overlays Enhance Operator Performance in Telepresence Tasks, a Dissertation submitted to the Department of Mechanical Engineering and the Committee on Graduate Studies of Stanford University in partial fulfillment of the requirements for the degree of Doctor of Philosophy, Jun. 1994.
Ruspini, D. et al., The Haptic Display of Complex Graphical Environments, Computer graphics Proceedings, Annual Conference Series, 1997.
Russo, M., The Design and Implementation of a Three Degree of Freedom Force Output Joystick, Submitted to the Department of Mechanical Engineering in partial fulfillment of the requirement for the degree of Masters of Science in Mechanical Engineering at the Mass. University of Technology, May 1990.
Safe Flight Instrument Corporation, Coaxial Control Shaker, part No. C-25502, Jul. 1, 1967, revised Jan. 28, 2002.
Scannell, T., Taking a Joystick Ride, Computer Currents, Boston Edition, vol. 9, No. 11, Nov. 1994.
Schena, B., Patent Application Transmittal, Directional Inertial Tactile Feedback using Rotating Masses, Sep. 28, 2001.
Schmult, B. et al., Application Areas for a Force-Feedback Joystick, DSC-vol. 49, Advances in Robotics, Mechatronics, and Haptic Interfaces, ASME 1993.
Shimoga, K. , Finger Force and Touch Feedback Issues in Dexterous Telemanipulation, Proceedings from the Fourth Annual Conference on Intelligent Robotic Systems fro Space Exploration, Rensselaer Plytechnic Institute, Troy, New York, Sep. 30-Oct. 1, 1992.
Snow, E. New Technology Transmittal, Model-X Force Reflecting Hand Controller, Jun. 15, 1989.
SMK, Multi-Functional Touch panel, Force-Feedback Type, Developed, Sep. 30, 2002.
SMK, Force Feedback Type Optical Touch Panel Developed, Oct. 30, 2002.
Stanley, M. et al., Computer Simulation of Interacting Dynamic Mechanical Systems using Distributed Memory Parallel Processors, DSC-vol. 42, Advances in Robotics, ASME 1992.
Terry, J. et al., Tactile Feedback in a Computer Mouse, Proceedings of the Fourteenth Annual Northeast Bioengineering Conference, Mar. 10-11, 1988, University of New Hampshire.
Wiker, S., Teletouch Display Development : Phase 1 Report, Technical Report 1230, Jul. 1988.
First Official Action dated Nov. 23, 2009 corresponding to Chinese Patent Application No. 200780012335.3.
Office Action issued by the State Intellectual Property Office of the People's Republic of China dated Aug. 20, 2010 for corresponding Chinese Application No. 2007-80012335.3.
Chinese Patent Office, Notification of the First Office Action, Application No. CN201410255319.9, dated Jul. 22, 2016, 8 pages.
European Patent Office, Communication Pursuant to Article 94(3) EPC, Application No. 07755062 dated Nov. 21, 2016.
CN 201410255319.9, "Office Action", dated Aug. 28, 2017, 6 pages.
CN 201410255319.9, "Office Action", dated Mar. 21, 2017, 6 pages.
EP 17189500.6, "Extended European Search Report", dated Nov. 10, 2017, 11 pages.

* cited by examiner

SYSTEMS AND METHODS FOR ENHANCED HAPTIC EFFECTS

CROSS REFERENCE TO RELATED APPLICATIONS

This application claims priority to U.S. Provisional Application No. 60/790,408, filed Apr. 6, 2006, entitled "A Vibrotactile Effects System," the entire disclosure of which is incorporated herein by reference.

FIELD OF THE INVENTION

The present invention generally relates to haptic control technology. More particularly, the present invention relates to systems and methods for haptic effects.

BACKGROUND

Portable devices are rapidly evolving into multi-function devices, which incorporate computing, communication, and entertainment functions in one device. Tactile feedback is increasingly incorporated into these portable devices, such as mobile phones, personal digital assistants, and other devices. Historically, however, portable devices have only featured basic vibration functionality. For example, mobile phones may only have the ability to pulse a vibration actuator on and off at a single amplitude.

These mobile phones and other haptic devices may drive a standard audio signal through a Multi-Function Transducer (MFT), to produce vibration. Some such devices may rely on existing frequencies of the audio signal to randomly drive vibration in the MFT, rather than using a specific vibration control signal. If such frequencies are not found in the audio signal, no vibration is produced.

While some vibration capability currently exists, developments in portable device technology and user demands are driving a need for advanced vibration capabilities in mobile phones. And manufacturers of these devices may seek various ways to employ such advanced vibration capabilities to their portable devices for enhanced functionality and control.

At the same time that demand for vibration feedback is growing, the number of different haptic devices that support vibration feedback is growing. The growing variety of different haptic devices creates a dilemma for device designers. On the one hand, a device designer may devote time and resources to tailoring vibrotactile feedback to the specific capabilities of different devices. Alternatively, a device designer may choose to provide the same generic vibrotactile feedback signal to many different devices, and accept that the generic signal may fail to take advantage of the enhanced functionality of any specific haptic device.

SUMMARY

Embodiments of the present invention provide systems and methods for enhanced haptic effects. One embodiment of the present invention implements a method comprising receiving an input signal formatted in a first format, the input signal having multimedia data and haptic information, decoding the haptic information, determining a parameter associated with an actuator in a haptic device, and generating an actuator signal based at least in part on the parameter and the haptic information. The method further comprises generating an output signal comprising the multimedia data and the actuator signal, the output signal formatted in a second format. In one embodiment, the method further comprises producing a haptic effect based at least in part on the output signal. In another embodiment, a computer readable medium comprises program code for carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
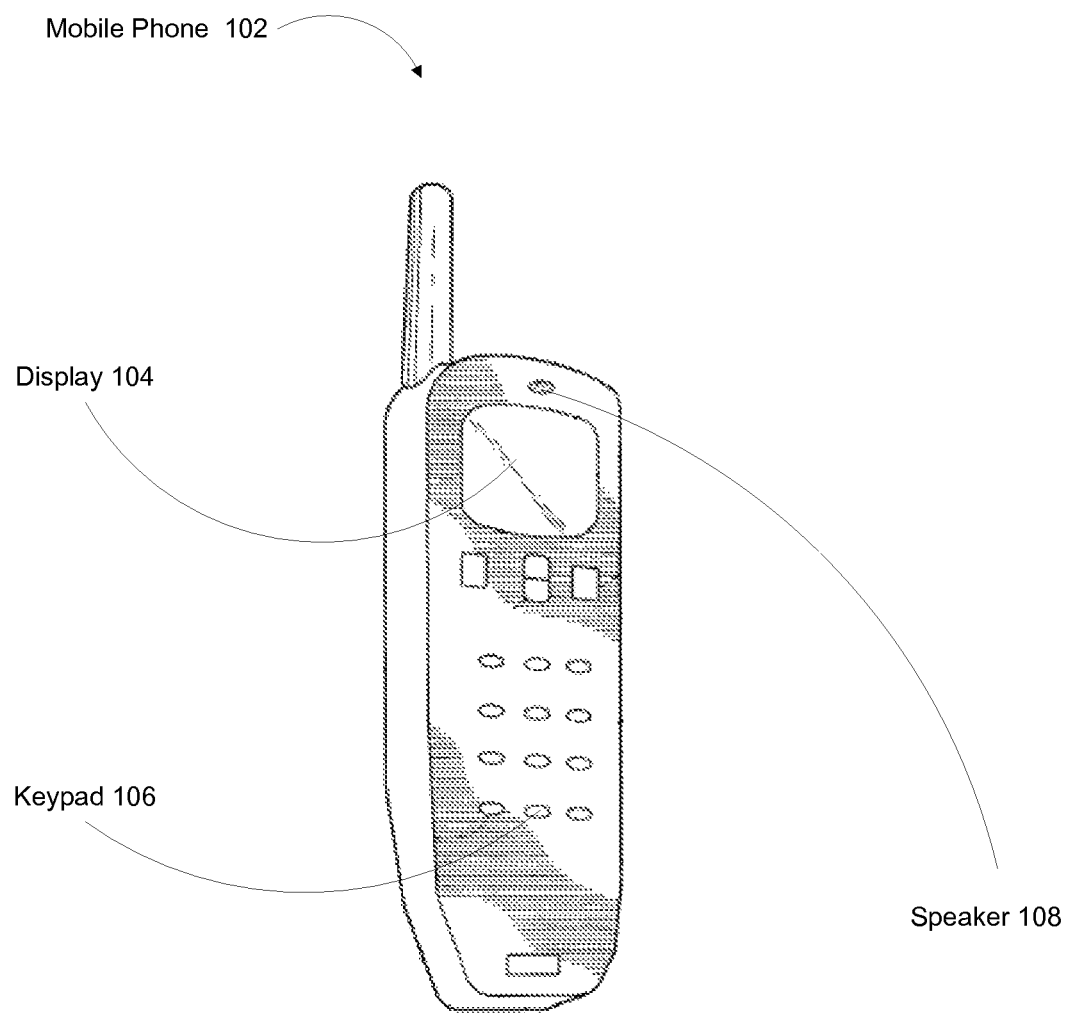
FIG. 1 is an illustration of a device for providing enhanced haptic feedback in one embodiment of the present invention.

Embodiments of the present invention provide systems and methods for enhanced haptic feedback. In one illustrative embodiment, a computer-readable medium stores information relating to the performance of a haptic device. A processor receives a media stream with haptic information encoded at a predetermined frequency. A processor uses a band pass filter to extract the haptic information from the media stream. The processor then generates an actuator signal for producing a haptic effect associated with the haptic information. The actuator signal is based, at least in part, on the information stored in the computer readable medium and related to the performance of a specific haptic device. After generating an actuator signal, the processor generates an output signal comprising the multimedia data and the actuator signal. The output signal is in the same format as the input signal. Once the processor generates the output signal, the haptic device may use an actuator to provide a haptic effect.

This example is given to introduce the reader to the general subject matter discussed. The invention is not limited to this example. Below, example systems and methods for enhanced haptic feedback are described.

Illustrative Devices for Enhanced Haptic Feedback

In one illustrative embodiment of a device configured to provide enhanced haptic feedback, a portable music player may be configured to play sound through a speaker and produce haptic effects with an actuator. In one such embodiment, the portable music player may comprise a processor configured to receive input data comprising audio data and haptic data. The processor extracts the haptic data from the input data. The processor then analyzes parameters associated with the actuator, such as the actuator's resonant frequency, and generates an actuator signal based at least in part on the haptic data and the parameters. The processor may then be further configured to output the audio data to the speaker to produce a sound and to transmit the actuator signal to the actuator to provide a haptic effect. In the illustrative embodiment, the actuator signal and the audio data may be transmitted such that the haptic effect is substantially synchronized with the sound.

Such an illustrative embodiment may be advantageously employed to play audio files in which haptic effects may be encoded along with audio data. Such audio files may provide music for a user to listen to, as well as synchronized haptic effects to enhance the experience of listening to music. Such an illustrative embodiment may also include video data, for example, to provide haptic effects synchronized with both sound and video. For example, haptic effects may be used to enhance the experience of watching a movie or playing a video game.

This second example is also given to introduce the reader to the general subject matter discussed herein. The invention is not limited to these examples. The following sections describe various embodiments of systems and methods for enhanced haptic feedback.

Enhanced Haptic Feedback

Referring now to the figures in which like numerals indicate like elements throughout the several figures, FIG. 1 is an illustration of a device for providing enhanced haptic feedback in one embodiment of the present invention. The device in FIG. 1 comprises a mobile phone 102 having a display 104, a keypad 106, and a speaker 108. While the embodiment shown in FIG. 1 comprises a mobile phone, other embodiments may comprise other devices. For example, other embodiments may comprise a personal digital assistant (PDA), a beeper, a portable music or video player, a game controller or other manipulandum, a portable game system, or a portable navigation device.

Figure 2:
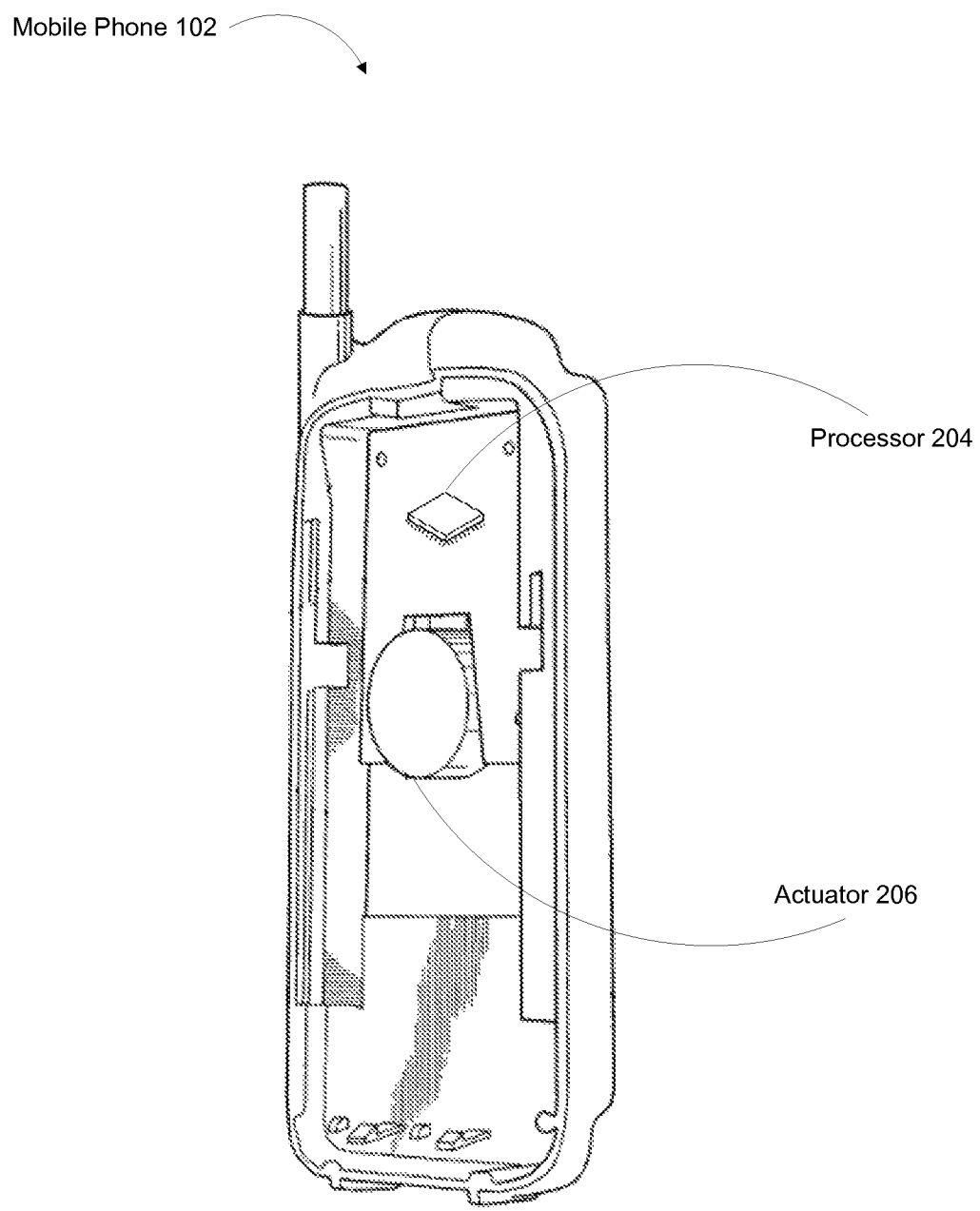
FIG. 2 is a second illustration of a device for providing enhanced haptic feedback in one embodiment of the present invention.

FIG. 2 is a second illustration of a device for providing enhanced haptic feedback in one embodiment of the present invention. FIG. 2 represents a perspective view of the interior of the mobile phone 102 shown in FIG. 1. The mobile phone 102 includes a processor 204 and an actuator 206. The processor 204 is in communication with the actuator 206.

The processor 204 is configured to receive an input signal formatted in a first format, the input signal having multimedia data and haptic information. The processor 204 is also configured to generate an output signal formatted in a second format. The output signal may comprise multimedia data and an actuator signal. The second format of the output signal may be the same as the first format of the input signal. The output signal may be transmitted to one or more elements of the mobile phone 102, such as the speaker 108 or the actuator 206. In one embodiment, the output signal may be transmitted to the speaker 108 and the actuator 206 at substantially the same time. In such an example, the speaker 108 of the mobile phone 102 may play a sound based at least in part on the multimedia data, and the actuator 206 may produce a haptic effect based at least in part on the actuator signal. In one embodiment, the haptic effect and the audio may be synchronized. For example, in one embodiment the speaker 108 may play the sound substantially simultaneously with the haptic effect produced by the actuator 206.

In other embodiments, the haptic effect may not be synchronized with the sound. In one embodiment, the actuator signal may be configured to generate no haptic effect. For example, if the haptic information is not recognized or is not useable, the actuator signal may be configured to generate no haptic effect.

While the device shown comprises one processor 204, other devices may comprise two or more processors. Processor 204, as well as other processors incorporated into one or more embodiments of the present invention, may comprise a computer-readable medium, such as a random access memory (RAM) coupled to the processor. The processor executes computer-executable program instructions stored in memory, such as executing one or more computer programs for generating vibrotactile or other haptic effects. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein. The instructions can comprise code from any suitable computer-programming language, including, for example, C, C+, C++, Visual Basic, Java, Python, and JavaScript.

The actuator 206 can be any of a variety of different types of actuators, including an eccentric rotating mass (ERM) actuator, a MFT, a linear mass actuator, an electromagnetic actuator, a motor, a voice coil, a pneumatic or hydraulic actuator, an electro-active polymer, or any other suitable actuator. In one embodiment, actuator 206 may comprise a plurality of actuators. For example, in one embodiment, two actuators may be employed. A first actuator may be configured to provide vibrotactile or other haptic effects having a high frequency of vibration (e.g. greater than 200 Hz), while a second actuator may be configured to provide vibrotactile or other haptic effects having a low frequency of vibration (e.g. less than 200 Hz). In another embodiment, a first actuator and a second actuator may be employed to provide haptic effects to simulate a directional effect. For example, the first and second actuators may be located on opposite sides of a device and may be actuated to provide haptic effects that appear to move from one side of the device to the other, or provide an indication of direction of a source of a vibration synchronized with an image on a screen.

Example of a System for Enhanced Haptic Feedback

Figure 3:
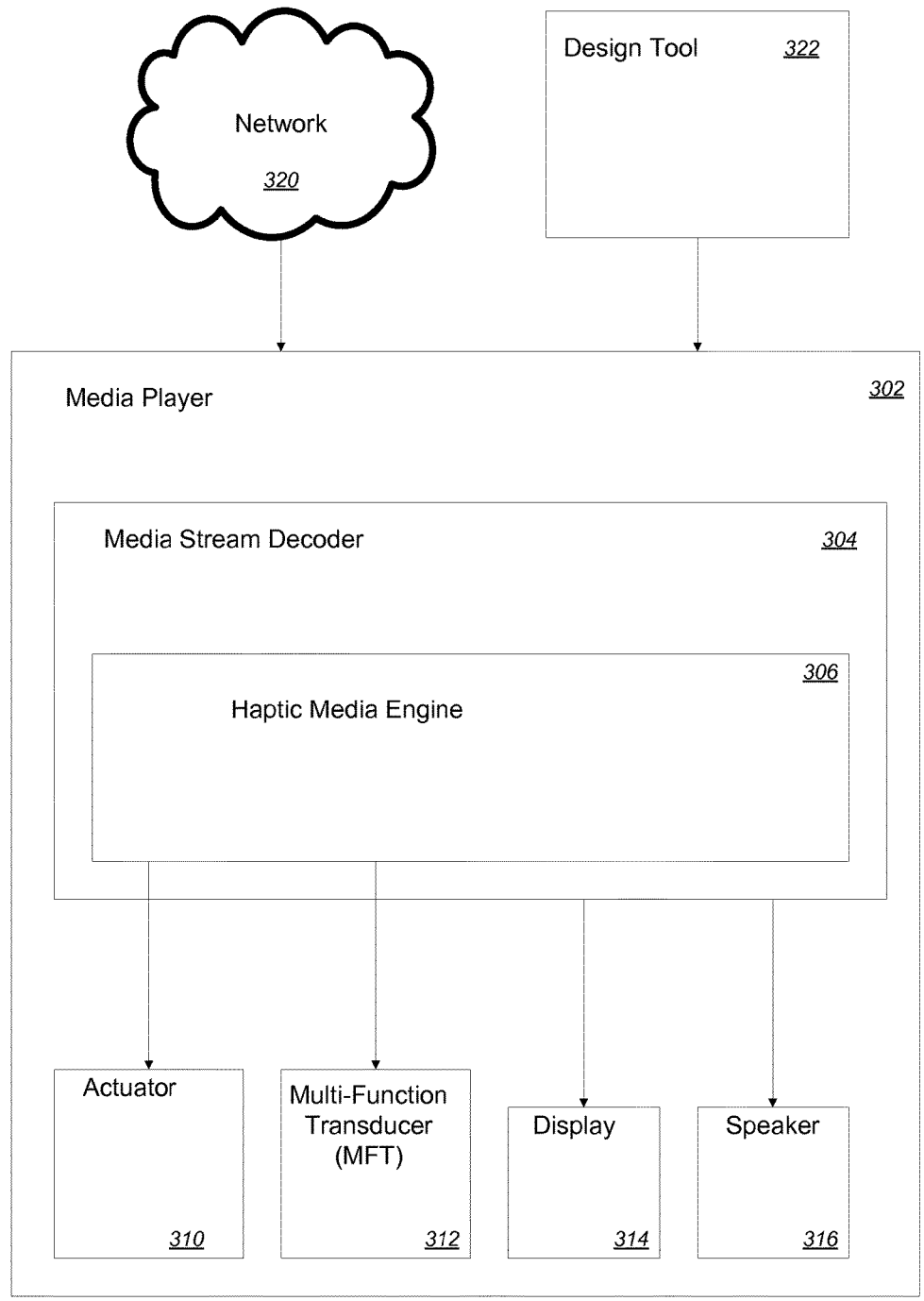
FIG. 3 is a block diagram illustrating a system for providing enhanced haptic feedback in one embodiment of the present invention.

FIG. 3 is a block diagram illustrating a system for providing enhanced haptic feedback in one embodiment of the present invention. In the embodiment shown, the system comprises a media player 302, a network 320, and a design tool 322. The media player 302 comprises a media stream decoder 304, a haptic media engine 306, an actuator 310, a multi-function transducer 312, a display 314, and a speaker 316.

The Media Player

The media player 302 may be configured to play audio through the speaker 316 and/or video through the display 314. In one embodiment, the media player 302 may be configured to provide haptic effects to a user with the MFT 312. In another embodiment, the media player 302 may be configured to provide haptic effects to a user with the actuator 310. The media player 302 may have a combination of one or more of the multi-function transducers 312 and one or more of the actuators 310. In one embodiment the media player 302 may comprise a full-fidelity vibrotactile player that may be capable of producing a wide range of vibrotactile and other haptic effects having varying strength, frequency, duration, rhythm, intonation, and other dynamics.

The media player 302 may be configured to receive an input signal having haptic information and multimedia data. In some embodiments, the multimedia data may be a multimedia file, containing one or more media streams, such as an audio stream and a video stream. In some embodiments, the input signal is received over a network 320, including without limitation the Internet or a cellular phone network. The media player 302 may receive the input signal wirelessly, such as through a wireless network (such as 802.11), cellular network, Bluetooth, infra-red, or other means for wireless transmission of data. In some embodiments, the media player 302 may receive the input signal over a direct electrical connection, such as Ethernet, Universal Serial Bus (USB), FireWire, parallel, or serial connection.

In other embodiments, the input signal is received from a local memory (not shown). The media player 302 may also be configured to receive the input signal from an application. For example, the media player 302 may receive the input signal from a design tool 322 for creating content, including haptic information.

Media player 302 comprises a media stream decoder 304. In one embodiment, media stream decoder 304 comprises program code executed by a processor (not shown). For example, a media player 302 may comprise a processor and a memory. The memory may comprise program code comprising the media stream decoder 304. Media stream decoder 304 may comprise program code for receiving an input signal having haptic information and multimedia data, where the input signal may be formatted in a first format.

The first format may be a multimedia format. For example, in one embodiment, the input signal comprises audio data formatted using the Motion Picture Experts Group-1 Audio Layer 3 (MP3) format. In one embodiment, the input signal may comprise video and/or data formatted using an Motion Picture Experts Group (MPEG) format. In other embodiments, other multimedia formats for audio and/or video data may be used, including Waveform Audio Format (WAV), Musical Instrument Digital Interface (MIDI), Ogg, DiVX™, QuickTime™, MP3, Apple™'s MPEG-4 Part 3 (M4P), Advanced Audio Coding (AAC) format, or any other format for encoding audio and/or video data. The input signal may be associated with a single media, such as an audio file. In other embodiments, the media stream may be a multimedia file, such as a movie file with audio and video data.

The input signal also includes haptic information. The haptic information may be stored as an independent media stream in the multimedia data. For example, in some embodiments, the haptic information may be embedded within the media, for example as a package within an existing multimedia file. The embedded haptic information may be placed within the input data in such a way as to make the haptic content invisible to media players that are not designed to recognize the haptic data. In other embodiments, the format of the input signal may be extended to include haptic data, such that a media player designed to recognize haptic information may choose to ignore or play the haptic information.

In some embodiments, the haptic information is encoded within a particular media stream. For example, the haptic information may be converted from its native format into the same format as the multimedia data. In one embodiment, the haptic data may be encoded as amplitude or frequency modulated data at one or more frequencies of the media stream data. For example, in one embodiment, haptic data may be encoded as amplitude modulated data on a carrier wave having a frequency of 140 Hz, then mixed into the existing audio stream. In another embodiment, haptic data may be encoded as frequency modulated data. The haptic data may be encoded at a frequency that is not recognized by the speakers of the haptic device. For example, if the speakers of the haptic device do not recognize frequencies below 135 Hz, the haptic information may be encoded at 130 Hz.

The haptic data may be encoded as information describing a haptic effect. For example, in one embodiment, haptic data may comprise data specifying a frequency, amplitude, duration, period, pulse width, envelope, and/or other information associated with a haptic effect to be output. In one embodiment, the haptic data may comprise a waveform to be output as a haptic effect. For example, rather than encoding information describing an actuator signal, data points defining a digitized actuator signal itself may be encoded as haptic data. In one embodiment, haptic data may comprise both information describing an actuator signal and data points defining at least part of a digitized actuator signal.

In one embodiment, synchronization data may be embedded into the input signal to synchronize the haptic effects with audio and/or video. Co-pending U.S. patent application Ser. No. 11/583,483, filed on Oct. 18, 2006, describes methods for synchronization of haptic effect data in a media transport stream, the entirety of which is herein incorporated by reference. For example, in one embodiment, haptic information in a series of frames in a multimedia data stream may be associated with corresponding time stamps. When the output signal is generated, the time stamps may be used to synchronize the actuator signal with the multimedia data, such that an actuator that receives the output signal provides a haptic effect at the same time a drum beat is played on a speaker.

In one example, the media player 302 may comprise a touch-sensitive screen, such as a touch screen. A user may select an object, such as a selection box, a window, or a particular file, through contact with the touch screen. For instance, a user may push a virtual button on the touch screen. In some embodiments, the media player 302 may then simultaneously play a sound effect and generate a haptic effect associated with the selection. In other embodiments, the media player 302 may then generate a haptic effect without playing a sound effect or other media.

In one embodiment, input data may comprise audio data and haptic data, wherein the haptic data is configured to provide haptic effects synchronized with a drum beat within the audio data. In another embodiment, haptic data may be inferred from audio data. For example, media stream decoder 304 may be configured to analyze audio and/or video data to determine frequency patterns associated with haptic events. For example, media stream decoder 304 may be configured to analyze audio data for low-frequency, high-amplitude signals that may be associated with an explosion and generate an associated haptic effect.

The media stream decoder 304 may further comprise program code for decoding the haptic information from the input signal. For example, in the embodiment shown in FIG. 3, the media stream decoder 304 comprises a haptic media engine 306. The haptic media engine 306 may have access to information describing the performance of the haptic device, and the capability to reformat the haptic information from the input signal to account for the specific parameters of the haptic device.

The haptic media engine 306 may be configured to decode haptic information from the input signal. The haptic media engine 306 may be configured to extract information describing an actuator signal or data points defining a digitized actuator signal from the input data. The haptic media engine 306 may be configured to extract haptic information from the input data at a specific predetermined frequency. In one embodiment, haptic media engine 306 may be configured to decode amplitude modulated data from a carrier wave having a specified frequency within the input data. In another embodiment, haptic media engine 306 may be configured to extract frequency modulated data from the input data.

In one embodiment, haptic data is encoded in the input signal at a predetermined frequency, for example, 140 hertz. The haptic media engine 306 may comprise a band pass filter. The band pass filter may decode haptic data at the predetermined frequency of the input signal.

The media stream decoder 304 may further comprise program code for determining a parameter associated with an actuator in a haptic device. For example, in one embodiment, haptic media engine 306 may determine a resonant frequency for the actuator 310 or multi-function transducer 312. Parameter data may comprise, such as, for example and without limitation, a resonant frequency of the actuator, a maximum peak-to-peak amplitude or magnitude of the actuator, or a minimum actuator response time. The parameter data may also include data associated with other components of the media player, such as audio frequencies for which the speaker 316 has poor frequency response.

In the embodiment shown in FIG. 3, the haptic media engine 306 further comprises program code for generating an actuator signal based at least in part on the parameter and the haptic information. For example, in one embodiment, the haptic media engine 306 may use the parameter associated with the actuator, such as the resonant frequency of the actuator. In such an embodiment, the haptic media engine 306 may generate an actuator signal having a frequency approximately equal to the resonant frequency of the actuator and with characteristics associated with the haptic information. For example, the actuator signal may be configured with amplitude and duration based at least in part on the haptic information. In one embodiment, the haptic information may comprise data points defining a digitized actuator signal. In such an embodiment, the haptic media engine 306 may generate an actuator signal having a frequency approximately equal to the resonant frequency of the actuator and having a waveform defined by the data points from the haptic information. In one embodiment, the haptic media engine 306 may generate an actuator signal having an amplitude equal to the maximum peak-to-peak amplitude of the actuator. In one embodiment, the haptic media engine 306 may generate an actuator signal based on the minimum response time of the actuator.

The media stream decoder 304 further comprises program code for generating an output signal comprising the multimedia data and the actuator signal, the output signal encoded in a second format. The second format may be a multimedia format, such as WAV, MIDI, Ogg, DivX™, QuickTime™, MP3, M4P, AAC, or any other format for encoding audio and/or video data. Alternatively, the output signal may formatted as an actuator signal. The second format may be the same as the first format.

In one embodiment, the actuator signal portion of the output signal may be transmitted directly to the actuator. For example, the output signal may be formatted as a direct voltage actuator signal, which is played directly to the actuator.

In other embodiments, the media player 302 may generate the output signal for use with a media mixer. A media mixer may receive various types of media and transmit the media to the appropriate devices. The media mixer may consolidate multiple incoming media into one output. In one embodiment, the media player 302 may generate the output signal on an actuator drive circuit or a media drive circuit.

Architecture

In the embodiment of the present invention shown in FIG. 3, the media player 302 is configured to receive data and use the data to play audio/video and to produce haptic effects. In the embodiment shown in FIG. 3, the media player 302 comprises a media stream decoder 304 application. The media stream decoder 304 shown in FIG. 3 is a software application configured to reside in memory within the media player 302 and to execute on a processor within the media player 302. The media stream decoder 304 may comprise code for receiving data from a data source, reading data stored in memory in the media player 302, and code for outputting data to an output device, such as actuator 310, multi-function transducer 312, speaker 316, and/or display 314. For example, the media player 302 may comprise non-volatile memory, such as flash memory, which may store parameters associated with one or more output devices, such as the actuator 310 or multi-function transducer 312.

In the embodiment shown in FIG. 3, the media stream decoder also comprises a haptic media engine 306. The haptic media engine 306 may be a dedicated application for extracting haptic information from input data, determining an actuator signal based at least in part on the haptic information and a parameter associated with the actuator 310, determining an output signal based at least in part on the actuator signal and the multimedia data, and outputting the actuator signal. The haptic media engine 306 may also be configured to read data stored in memory (not shown) within the media player 302. For example, the haptic media engine 306 may be configured to read data comprising parameters associated with the actuator 310 or multi-function transducer 312. The haptic media engine 306 may operate in coordination with the media stream decoder 304 to provide haptic effects encoded within a stream of multimedia data received by the media stream decoder 304.

In one embodiment, the media stream decoder 304 may comprise code for interacting with a data source, such as, for example and without limitation, a hard drive, a CD player, a DVD player, a flash drive, memory, or a network connection. In one embodiment, the media stream decoder is configured to receive data from memory, such as a ring tone. A ring tone may comprise a sound file formatted to play on a mobile phone or other device, which is played to indicate an incoming phone call. The media stream decoder may read ring tone data associated with the ring tone. The media stream decoder may extract and process audio data within the ring tone data. For example, the media stream decoder 304 may construct an audio signal to be output to the speaker 316 based at least in part on the ring tone data. The media stream decoder may also provide the ring tone data to the haptic media engine 306.

The haptic media engine 306 may extract haptic information from the ring tone data. The haptic media engine 306 may also read parameter data associated with the actuator 310 from memory local to the media player 302. The haptic media engine 306 may construct an actuator signal based at least in part on the haptic information. The haptic media engine 306 may then modify the actuator signal based at least on the parameter data associated with the actuator. For example, the ring tone data may comprise a digitized waveform to generate a haptic effect, wherein the waveform has a frequency of 200 Hz. The haptic media engine 306 may calculate a new actuator signal having a frequency approximately equal to a resonant frequency of the actuator 310, such as, for example, 140 Hz. The haptic media engine 306 may also normalize the amplitude of the digitized waveform to correspond to the performance characteristics of the actuator 310 and the media player 302. For example, actuator 310 may be constrained to input actuator signals having a maximum peak-to-peak amplitude of 3 volts. If the digitized waveform comprises a maximum peak-to-peak amplitude of 5 volts, the haptic media engine 306 may normalize the digitized waveform to have a 3 volt peak-to-peak maximum amplitude. Other characteristics associated with the actuator 310 may be used to modify haptic information. For example, actuator 310 may have a large eccentric mass resulting in an actuator that takes longer to accelerate and decelerate. Such an actuator may not be capable of playing very rapidly sequenced vibrations. In such an embodiment, the haptic media engine 306 may re-shape the actuator signal constructed from the haptic information to conform to the performance characteristics of the actuator. For example, the haptic media engine 306 may combine three short pulses having a pulse width smaller than the smallest pulse the actuator is capable of generating to create two pulses.

In the embodiment shown, after the haptic media engine 306 has constructed an actuator signal, the haptic media engine 306 may transmit the actuator signal to the media stream decoder 304, which may then output both the audio signal and the actuator signal to provide a haptic effect substantially synchronized with the audio. In one embodiment, the haptic media engine 306 may receive a command from the media stream decoder 304 to output the actuator signal. In one embodiment, the haptic media engine 306 may output the actuator signal directly to the actuator 310 without a command from the media stream decoder 304.

In one embodiment, the haptic media engine 306 may be configured to generate an output signal comprising the multimedia data and the actuator signal. In some embodiments, the output signal may be in the same format as the input data received by the media stream decoder 304. For example, the output signal may be a mp4 file with media and haptic information.

In one embodiment, the output signal may be optimized for a specific haptic device. If an output signal is optimized for playback on a specific device, the device receiving the output signal may be capable of playing the output signal using multiple components of the device, such as a display, a speaker, and one or more actuators. For example, in one embodiment, the haptic media engine 306 may encode the haptic drive signal at a specific frequency which is not processed by the speaker of a haptic device. In such an embodiment, the output signal may be played on a haptic device such that a speaker of the haptic device would play the output signal, and because the speaker is not responsive to the frequency on which the actuator signal is coded, minimal audio distortion while an actuator would interpret the haptic portion of the output signal.

The haptic media engine 306 may generate the output signal based at least in part on a user preference. For example, a user preference may indicate one volume level for audio, a brightness level for video, and a vibration level for haptic effects. In one such embodiment, the haptic media engine 306 may be capable of maximizing the strength of the haptic portion of the output signal while halving the audio portion of the output signal.

Example of a Method for Enhanced Haptic Feedback

Figure 4:
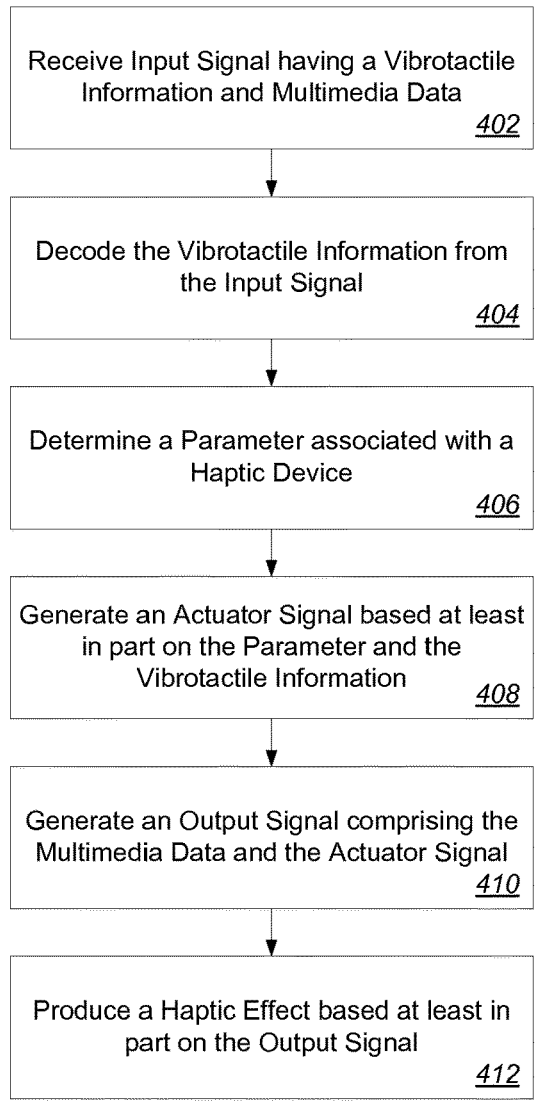
FIG. 4 is a flow diagram illustrating a method for providing enhanced haptic feedback in one embodiment of the present invention.

FIG. 4 is a flow diagram illustrating a method for providing enhanced haptic feedback in one embodiment of the present invention. In step 402, an input signal is received by the media player 302. The media player 302 may receive the input signal as a digital signal. In another embodiment, the media player 302 may receive the input signal as an analog signal. The input signal may comprise haptic information and multimedia data. In one embodiment, the signal may be formatted in a multimedia format, such as the MP3 format.

In step 404, the media stream decoder 304 decodes the haptic information from the input signal. The haptic information may be encoded in the input signal at a specific frequency. In one embodiment, the haptic information may be interlaced in the input signal with the multimedia data. In such an embodiment, the input data may comprise multimedia data and haptic information, wherein the multimedia data and haptic information alternate positions within the input data. For example, multimedia data may comprise packets of data having a first fixed number bytes of data per packet, while haptic information may comprise packets of data having a second fixed number of bytes of data per packet. Input data may comprise a series of packets of data wherein every packet of multimedia data is followed by one packet of haptic information. In other embodiments, the multimedia data may be interlaced with the haptic information with different orderings and numbers of multimedia data and haptic information.

In step 406, the haptic media engine 306 determines a parameter associated with a haptic device. The haptic media engine 306 may determine a plurality of parameters associated with a haptic device. In one embodiment, the parameters may be stored locally by the haptic media engine 306. In such an embodiment, the haptic media engine 306 may access such locally stored parameter to generate an actuator signal. For example, the haptic media engine 306 may access a configuration file stored in a local memory to determine a parameter associated with a haptic device.

In some embodiments, the haptic media engine 306 may determine a parameter associated with a Haptic Device by calculating the parameter. For example, if the haptic media engine 306 does not access a configuration file, the haptic media engine 306 may calculate a default parameter for a class of actuators 310 used in the media player 302.

In step 408, the haptic media engine 306 generates an actuator signal based at least in part on the parameter and the haptic information. The actuator signal may be specific to an actuator on the media player 302. In one embodiment, the actuator signal may be a raw vibration drive signal stream. In one embodiment the haptic media engine 306 may generate an actuator signal having a frequency approximately equal to the resonant frequency of the actuator and with characteristics associated with the haptic information.

In step 410, the haptic media engine 306 generates an output signal comprising the actuator control signal. In one embodiment, the actuator control signal is formatted in the same format as the input signal. In another embodiment, the actuator control signal is formatted in a different format than the input signal.

In one embodiment, the actuator control signal may be transmitted directly to the actuator drive hardware. In one embodiment, the actuator control signal may be transmitted to a media stream mixer. In such an embodiment, audio data from the audio stream may be mixed with the actuator control signal and transmitted to a multi-function transducer, which produces both sound and vibration.

In step 412, the media player 302 generates a haptic effect based at least in part on the output signal. In one embodiment, the media player 302 may generate a haptic effect by transmitting the output signal to an actuator 310. In another embodiment, the media player 302 may generate a haptic effect by transmitting the output signal to a multi-function transducer 312.

The haptic effect may be generated 412 at substantially the same time as the output the multimedia data is played by the device. In one embodiment, the haptic effect may be generated at the same time the display 314 reproduces video data. As another example, in one embodiment the media player 302 vibrates at the same time the media player 302 plays a drum beat through a speaker 316. Alternatively, in other embodiments, the haptic effect is generated slightly before or slightly after the multimedia data is played.

The haptic effect produced 412 may be a kinesthetic feedback effect. In other embodiments, the haptic effect produced 412 may be a vibrotactile feedback effect, such as a vibration. In some embodiments, the haptic effect produced 412 is a combination of effects.

Embodiments of the present invention provide various advantages over conventional systems and methods for providing haptic feedback. For instance some embodiments output actuator signals with full fidelity. Further, some embodiments provide a wide range of control over the strength, frequency, duration, rhythm, intonation and dynamics, including the ability to ramp vibration output up and down and stop it sharply. Through such enhanced haptic effects, devices of the present invention may be easier to use, and capable of generating realistic, entertaining haptic simulation of events and emotions.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:
receiving an input signal having haptic information and multimedia data, the input signal formatted in a first format, and wherein the multimedia data does not comprise encoded haptic information;
determining haptic information from the input signal;
determining a resonant frequency associated with an actuator in a haptic device;
generating an actuator signal based at least in part on the resonant frequency and the haptic information;
generating an output signal comprising the multimedia data and the actuator signal, the output signal formatted in a second format, wherein the actuator signal portion of the output signal is encoded onto a carrier wave that is then encoded as frequency modulated data on an audio portion of the multimedia data of the output signal, and
transmitting the output signal to an output device.

2. The method of claim 1, further comprising producing a haptic effect based at least in part on the output signal.

3. The method of claim 1, wherein the input signal further includes synchronization data.

4. The method of claim 1, wherein the multimedia data comprises at least one of audio data or video data.

5. The method of claim 1, wherein the first format is a multimedia format.

6. The method of claim 5, wherein the multimedia format is one of: a WAV format, a MIDI format, an Ogg format, a DIVX format, a QuickTime format, a MP3 format, a MPEG-2 format, a MPEG-4 format, a M4P format, or an AAC format.

7. The method of claim 1, further comprising determining a parameter associated with the actuator and generating an actuator signal based at least in part on the parameter.

8. The method of claim 7, wherein the parameter associated with the actuator in the haptic device comprises a dynamic response characteristic.

9. The method of claim 7, wherein the parameter associated with the actuator in the haptic device comprises a frequency response characteristic.

10. The method of claim 1, wherein the output signal comprises the same format as the input signal.

11. A non-transitory computer-readable medium on which is encoded processor-executable program code, comprising:
program code for receiving an input signal having haptic information and multimedia data, the input signal formatted in a first format, and wherein the multimedia data does not comprise encoded haptic information:
program code for determining haptic information from the input signal;
program code for determining a resonant frequency associated with an actuator in a haptic device;
program code for generating an actuator signal based at least in part on the resonant frequency and the haptic information;

program code for generating an output signal comprising the multimedia data and the actuator signal, the output signal formatted in a second format, wherein the actuator signal portion of the output signal is encoded onto a carrier wave that is then encoded as frequency modulated data on an audio portion of the multimedia data of the output signal, and program code for transmitting the output signal to an output device.

12. The computer-readable medium of claim 11 further comprising program code for producing a haptic effect based at least in part on the output signal.

13. A system comprising:
a processor configured to:
receive an input signal having haptic information and multimedia data, the input signal formatted in a first format, and wherein the multimedia data does not comprise encoded haptic information;
determine haptic information from the input signal;
determine a haptic drive signal comprising the haptic information based at least in part on a resonant frequency specific to a haptic device;
generate an actuator signal based at least in part on the resonant frequency and the haptic information;
generate an output signal comprising the multimedia data and the actuator signal, the output signal formatted in a second format, wherein the actuator signal portion of the output signal is encoded onto a carrier wave that is then encoded as frequency modulated data on an audio portion of the multimedia data of the output signal, and
transmit the output signal to an output device.

14. The system of claim 13, further comprising an actuator configured to produce a haptic effect based at least in part on the output signal.

15. The system of claim 13, wherein the system further comprises a local memory in communication with the processor.

16. The system of claim 15, wherein the local memory is configured to store a parameter specific to a haptic device.

17. The system of claim 15, wherein the local memory is configured to store a multimedia file.

18. The method of claim 1, wherein the output device comprises a multi-function transducer.

19. The method of claim 18, wherein the multi-function transducer is configured to output both sound and vibration.

20. The computer readable medium of claim 11, wherein the output device comprises a multi-function transducer.

21. The method of claim 20, wherein the multi-function transducer is configured to output both sound and vibration.

22. The system of claim 13, wherein the output device comprises a multi-function transducer.

23. The method of claim 22, wherein the multi-function transducer is configured to output both sound and vibration.

* * * * *